United States Patent
Yamamoto

(10) Patent No.: US 9,218,899 B2
(45) Date of Patent: Dec. 22, 2015

(54) SUPERCONDUCTING CABLE COOLING SYSTEM

(71) Applicant: MAYEKAWA MFG. CO., LTD., Tokyo (JP)

(72) Inventor: Keiichi Yamamoto, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 173 days.

(21) Appl. No.: 13/973,914

(22) Filed: Aug. 22, 2013

(65) Prior Publication Data
US 2013/0333912 A1 Dec. 19, 2013

Related U.S. Application Data

(63) Continuation of application No. PCT/JP2011/054312, filed on Feb. 25, 2011.

(51) Int. Cl.
| | |
|---|---|
| *H01B 12/16* | (2006.01) |
| *F28F 1/00* | (2006.01) |
| *H02G 15/34* | (2006.01) |
| *F25D 3/10* | (2006.01) |

(52) U.S. Cl.
CPC *H01B 12/16* (2013.01); *F25D 3/10* (2013.01); *F28F 1/00* (2013.01); *H02G 15/34* (2013.01); *Y02E 40/647* (2013.01); *Y02E 40/648* (2013.01)

(58) Field of Classification Search
CPC .................................. H01B 12/16; F28F 1/00
USPC .......................................... 174/15.5; 165/295
See application file for complete search history.

(56) References Cited

U.S. PATENT DOCUMENTS

| | | | |
|---|---|---|---|
| 3,406,245 A | | 10/1968 | Watkins |
| 5,548,967 A | * | 8/1996 | Ghiraldi ............................ 62/99 |
| 6,354,087 B1 | | 3/2002 | Nakahara et al. |
| 2006/0266072 A1 | | 11/2006 | Takeuchi et al. |

(Continued)

FOREIGN PATENT DOCUMENTS

| | | |
|---|---|---|
| EP | 1026755 A1 | 8/2000 |
| JP | 44-029708 B1 | 12/1969 |
| JP | 642830 A | 2/1994 |

(Continued)

OTHER PUBLICATIONS

International Preliminary Report on Patentability dated Sep. 6, 2013, corresponds to PCT/JP2011/054312.

(Continued)

*Primary Examiner* — Timothy Thompson
*Assistant Examiner* — Charles Pizzuto
(74) *Attorney, Agent, or Firm* — Hauptman Ham, LLP

(57) ABSTRACT

The present invention relates to a superconducting cable cooling system which pumps a coolant for cooling a superconducting cable to a heat exchange section by using a circulation pump, and cools the coolant by a refrigerator. Specifically, the superconducting cable cooling system includes a heat exchange unit having a cooling space charged with a liquefied gas, a flow rate sensor which detects the flow rate of the coolant, a temperature sensor which detects the temperature of the liquefied gas charged in the heat exchange unit, and a control section which controls the refrigerator based on the detected values of the flow rate sensor and the temperature sensor such that the temperature of the liquefied gas charged in the heat exchange unit has a specific value.

7 Claims, 6 Drawing Sheets

(56) References Cited

U.S. PATENT DOCUMENTS

2008/0202127 A1    8/2008  Mukoyama et al.
2010/0328882 A1*  12/2010  Campbell et al. .............. 361/689

FOREIGN PATENT DOCUMENTS

| JP | 8-152204    | A | 6/1996  |
|----|-------------|---|---------|
| JP | 11325630    | A | 11/1999 |
| JP | 2004-233010 | A | 8/2004  |
| JP | 2004316971  | A | 11/2004 |
| JP | 20053314    | A | 1/2005  |
| JP | 2006-012654 | A | 1/2006  |
| JP | 2006-052921 | A | 2/2006  |
| JP | 2007-023966 | A | 2/2007  |
| WO | 9962127     | A1| 12/1999 |

OTHER PUBLICATIONS

Office Action mailed Mar. 11, 2014, corresponds to Japanese patent application No. 2013-500796.

International Search Report issued in PCT/JP2011/054312, dated Jun. 7, 2011.

* cited by examiner

SUPERCONDUCTING CABLE COOLING SYSTEM

RELATED APPLICATIONS

The present application is a continuation of International Application Number PCT/JP2011/054312, filed Feb. 25, 2011, the disclosure of which is hereby incorporated by reference herein in its entirety.

TECHNICAL FIELD

The present invention relates to the technical field of a superconducting cable cooling system for cooling a superconducting cable, used in transmission and distribution of electric power, to a cryogenic temperature.

BACKGROUND ART

There is a superconducting cable for transmission and distribution of electric power which uses, as a material, a superconductor having an electrical resistance value of substantially zero under a cryogenic temperature. In order to secure excellent power transmission efficiency of the superconducting cable, it is necessary to stably maintain the superconducting cable in a cryogenic state, and study and development of a cooling system having such a cooling ability are promoted. Note that, in general, a high-temperature superconductor is used as the material of the superconducting cable, and liquid nitrogen is used as a coolant for cooling.

Herein, with reference to FIG. 10, the structure of a conventional superconducting cable cooling system 100 (hereinafter referred to as "a cooling system 100" appropriately) will be briefly described. FIG. 10 is a structural view schematically showing the entire structure of the conventional superconducting cable cooling system 100.

The cooling system 100 has a superconducting cable 1 formed of the high-temperature superconductor as a cooling target, and uses liquid nitrogen as the coolant for cooling the superconducting cable 1. The coolant having cooled the superconducting cable 1 is temporarily stored in a reservoir tank 2. In the reservoir tank 2, the coolant is pressurized to a specific pressure value by a pressurization device 3, and is stored. A controller of the pressurization device 3 which is not shown acquires the pressure value detected by a pressure sensor 4 provided in the reservoir tank 2 and feedback-controls the pressurization device 3 such that the acquired pressure value has a specific value, and the specific pressure value is thereby maintained.

A circulation pump 5 is provided on the downstream side of the reservoir tank 2, and the coolant stored in the reservoir tank 2 is pumped to a refrigerator 6 by the drive of the circulation pump 5, and is cooled. The refrigerator 6 is a GM refrigerator or a Stirling refrigerator. The coolant cooled by the refrigerator 6 is supplied to the superconducting cable 1 again and used for cooling in a superconducting state. A temperature sensor 7 and a flow rate sensor 8 for detecting the temperature and the flow rate of the coolant are provided on the downstream side of the refrigerator 6, and the refrigerator 6 is feedback-controlled such that the temperature of the coolant has a specific value by cooling based on the detected values thereof.

Thus, in the example shown in FIG. 10, a circulation cycle in which the coolant having a temperature increased by cooling the superconducting cable 1 is cooled via a circulation path 9 provided with the reservoir tank 2, the circulation pump 5, and the refrigerator 6, and then supplied to the superconducting cable 1 again is repeated. Patent Document 1 is an example of the cooling system which uses a method of cooling the coolant and supplying the coolant to the superconducting cable 1 in the above circulation cycle.

Patent Document 1: Japanese Patent Application Laid-open No. 2006-12654

In the cooling system in which the coolant is cooled and supplied to the superconducting cable 1 in the above circulation cycle, it is necessary to control the temperature of the coolant at a coolant supply entrance to the superconducting cable 1 (the downstream side of the flow rate sensor 8 in FIG. 10) such that the temperature thereof has a constant value in order to maintain the cooling temperature of the superconducting cable 1 at a constant value. There are roughly the following three heat losses which occur when the superconducting cable 1 is cooled. They are (i) a loss caused by the amount of heat entering from the outside of the superconducting cable 1, (ii) a loss caused by an AC loss occurring when an AC current (or voltage) is passed through the superconducting cable 1, and (iii) a loss occurring in the circulation pump 5 which circulates the coolant. In particular, the heat loss by (ii) tends to change in response to a fluctuation in the load of the superconducting cable 1 during transmission of electric power.

In the above example, the control operation is performed by feedback-controlling the coolant temperature based on the detected values of the temperature sensor 7 and the flow rate sensor 8. Such a control operation is useful in a static system in which the heat loss is constant with time. However, there are cases where the heat loss occurring in the superconducting cable 1 fluctuates with time as described above and, in such cases, there is a problem that it becomes difficult to control the temperature of the coolant.

In addition, in the above example, the GM refrigerator or the Stirling refrigerator is used as the refrigerator 6. Accordingly, the control of the temperature of the coolant is performed by controlling an intermittent operation in the GM refrigerator or an operation cycle in the Stirling refrigerator. In a case where the refrigerator 6 of this type is used, in order to control the refrigerator 6, it is necessary to measure control parameters such as the temperature and the flow rate at a specific measurement point in the circulation path 9, and feedback-control the refrigerator 6. However, when consideration is given to the practical aspect of the superconducting cable, the scale of the superconducting cable is large with its length reaching several kilometers, and hence it is not easy to select the optimum position of the measurement point. In particular, while the length of the superconducting cable 1 is in the order of several kilometers, the actual expected velocity of flow of the coolant is assumed to be about a few tens of cm/s. As a result, a time period required for the coolant to make the circuit of the circulation path 9 reaches several hours, and a time constant of circulation of the coolant is extremely increased. On the other hand, the time constant related to the operation of the refrigerator 6 which performs the temperature control of the coolant (e.g., the clock frequency of a controller or the like) is extremely small, and is significantly different from the time constant of circulation of the coolant. Consequently, in the above example, in a dynamic system such as the case where the heat loss in the superconducting cable 1 fluctuates with time, there is a problem that it is not easy to control the entrance temperature of the coolant such that the entrance temperature thereof has a constant value.

DISCLOSURE OF THE INVENTION

The present invention has been achieved in view of the above problem, and an object thereof is to provide a superconducting cable cooling system capable of supplying the coolant having a stable temperature to the superconducting cable.

In order to solve the above problem, the superconducting cable cooling system according to the present invention is a superconducting cable cooling system which forms a circulation path by pumping a coolant used for cooling a superconducting cable to a heat exchange section by using a circulation pump, and cooling the coolant by a refrigerator, then supplying the coolant to the superconducting cable, thereby cooling the superconducting cable, this superconducting cable cooling system including: a heat exchange unit which has a cooling space charged with a liquefied gas for causing the heat exchange section and the refrigerator to perform heat exchange; a flow rate detection unit which detects a flow rate of the coolant in the circulation path; a temperature detection unit which detects a temperature of the liquefied gas charged in the heat exchange unit; and a control section which controls the refrigerator based on the flow rate detected by the flow rate detection unit and the temperature detected by the temperature detection unit such that the temperature of the liquefied gas charged in the heat exchange unit has a specific value.

According to the present invention, the coolant which is used to cool the superconducting cable and has a temperature increased by the use is cooled by being pumped to the heat exchange section provided on the circulation path by the circulation pump and being subjected to heat exchange with the liquefied gas charged in the cooling space in the heat exchange unit. At this point, the amount of heat from the superconducting cable received by the coolant flowing in the circulation path is accumulated in the liquefied gas, and a thermal load accumulated in the liquefied gas is removed by the refrigerator. That is, in the present invention, it is possible to cause the liquefied gas to function as a thermal buffer by temporarily accumulating the thermal load from the superconducting cable in the liquefied gas. With this, the refrigerator controls the temperature of the liquefied gas such that the temperature thereof has a specific value, and it is thereby possible to control the temperature of the coolant such that the temperature thereof can be stably maintained even in a case where the amount of heat generated in the superconducting cable fluctuates with time.

Preferably, the refrigerator is a Brayton cycle refrigerator having a Brayton cycle heat exchange section disposed in the cooling space. The Brayton cycle refrigerator is a refrigerator which performs cooling using a compressor and an expander, and has the Brayton cycle heat exchange section as the heat exchange section. In the present aspect, by disposing the Brayton cycle heat exchange section in the cooling space charged with the liquefied gas together with the heat exchange section provided on the circulation path, it is possible to perform heat exchange by using the liquefied gas charged in the cooling space as a medium to thereby perform the cooling of the superconducting cable.

In addition, a reservoir tank, which pressurizes the coolant flowing in the circulation path to a specific pressure and stores the coolant, may be connected to the circulation path. With this, even in a case where the volume or the pressure of the coolant changes in response to the fluctuation of the temperature of the coolant flowing in the circulation path, it is possible to absorb the change of the volume or the pressure using the reservoir tank.

In one aspect of the present invention, in a case where a plurality of superconducting cables are provided, circulation paths are formed in correspondence to the individual superconducting cables, and heat exchange sections in the individual circulation paths are disposed in the single cooling space. According to this aspect, the heat exchange sections provided in the individual circulation paths are disposed in the single heat exchange unit having the cooling space charged with the liquefied gas. Consequently, the control section can stably control the temperature of the coolant flowing in the plurality of the circulation paths only by controlling the temperature of the liquefied gas charged in the cooling space of the single heat exchange unit.

Particularly, in a case where the plurality of the superconducting cables are connected in series, the heat exchange sections included in the circulation paths formed in correspondence to the adjacent superconducting cables from among the plurality of the superconducting cables are preferably disposed in the cooling space. In a case where the superconducting cable is used for long-distance power transmission, there are cases where the long-distance power transmission is achieved by connecting a plurality of the superconducting cables in series. In such cases, it is possible to supply the coolant having the stable temperature to the plurality of the superconducting cables by forming the circulation path for each of the plurality of the superconducting cables connected in series and disposing the heat exchange sections provided in the circulation paths corresponding to the adjacent superconducting cables in the single cooling space.

As another aspect of the present invention, the superconducting cable cooling system may further include a decompression unit which decompresses the liquefied gas charged in the cooling space of the heat exchange unit. According to this aspect, even in a case where the refrigerator is stopped due to a cause such as the periodic check or the breakdown of the refrigerator, it is possible to cool the liquefied gas by decompressing the liquefied gas using the decompression unit. That is, it is possible to cause the decompression unit to function as a backup unit when the refrigerator is stopped, and hence it is possible to construct the cooling system having higher reliability.

In addition, as another aspect of the present invention, a plurality of the heat exchange sections may be provided in the circulation path, and the circulation pump may be provided between any plurality of the heat exchange sections. According to this aspect, it is possible to have a large difference in the temperature of the coolant between the exit and the entrance in the superconducting cable by disposing the circulation pump between the plurality of the heat exchange sections, and it becomes possible to reduce the size of the circulation pump or the refrigerator by reducing the flow rate of the coolant.

According to the present invention, the coolant which is used to cool the superconducting cable and has a temperature increased by the use is cooled by being pumped to the heat exchange section provided on the circulation path by the circulation pump and being subjected to heat exchange with the liquefied gas charged in the cooling space in the heat exchange unit. At this point, the amount of heat from the superconducting cable received by the coolant flowing in the circulation path is accumulated in the liquefied gas, and the thermal load accumulated in the liquefied gas is removed by the refrigerator. That is, in the present invention, it is possible to cause the liquefied gas to function as the thermal buffer by temporarily accumulating the thermal load from the superconducting cable in the liquefied gas. With this, the refrigerator controls the temperature of the liquefied gas such that the temperature thereof has the specific value, and it is thereby possible to control the temperature of the coolant such that the temperature thereof can be stably maintained even in the case where the amount of heat generated in the superconducting cable fluctuates with time.

BEST MODE FOR CARRYING OUT THE INVENTION

Hereinbelow, preferred embodiments of the present invention will be illustratively described in detail with reference to the drawings. However, the scope of the present invention is not limited only to dimensions, materials, shapes, and relative arrangements of constituent parts described in the embodiments unless specifically described, and they are merely illustrative examples.

First Embodiment

Figure 1:
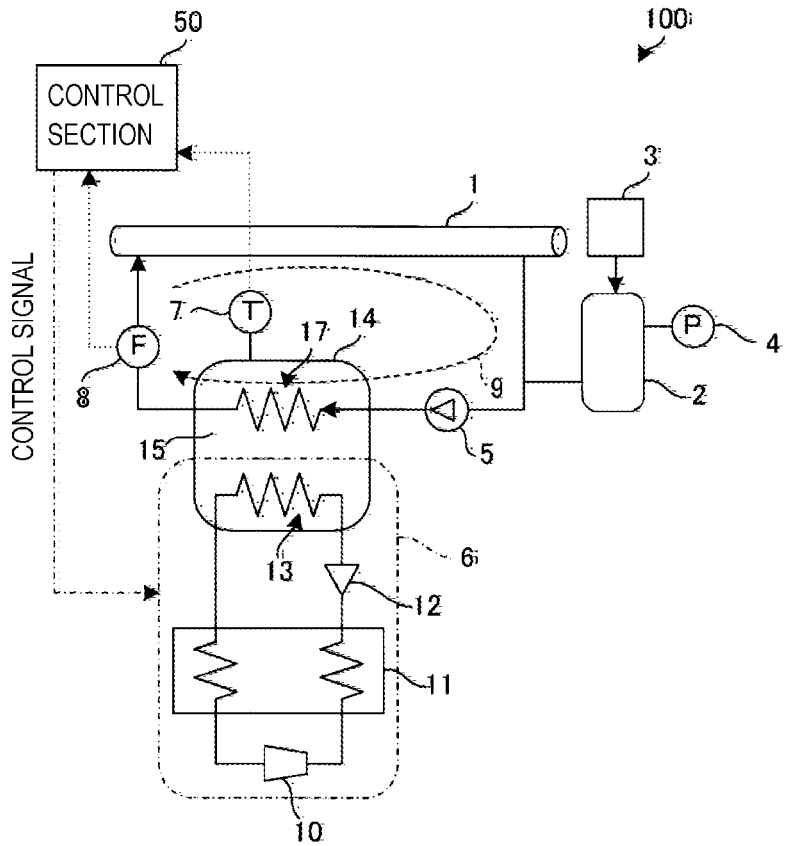
FIG. 1 is a structural view schematically showing the entire structure of a superconducting cable cooling system according to a first embodiment.
Figure 10:
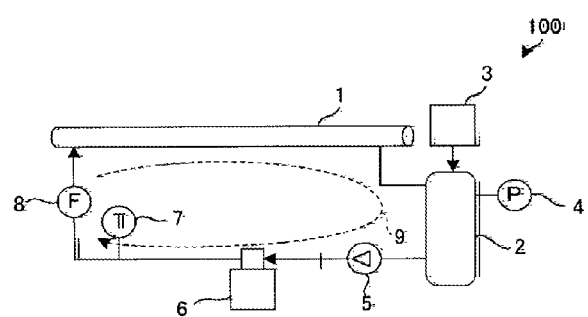
FIG. 10 is a structural view schematically showing the entire structure of a conventional superconducting cable cooling system.

FIG. 1 is a structural view schematically showing the entire structure of a superconducting cable cooling system 100 according to a first embodiment. Note that components which are the same as those in BACKGROUND ART described with reference to FIG. 10 are designated by the same reference numerals and the description of details thereof will be appropriately omitted.

The cooling system 100 forms a circulation path 9 by pumping a coolant used for cooling a superconducting cable 1 to a heat exchange section 17 using a circulation pump 5, cooling the coolant, and then supplying the coolant to the superconducting cable 1 again to thereby cool the superconducting cable 1. The superconducting cable 1 is formed of a high-temperature superconductor, and is cooled by the coolant (liquid nitrogen) flowing in the circulation path 9. Note that, although the coolant flowing in the circulation path 9 is not shown in FIG. 1, the circulation path 9 is constituted such that the entry of heat from the outside can be prevented basically by decompression of the surrounding area of the flow path except for the vicinity of the heat exchange section 17.

On the upstream side of the circulation pump 5 in the circulation path 9, a reservoir tank 2 for pressurizing the coolant flowing in the circulation path 9 to a specific value and storing the coolant is connected. The volume of the coolant flowing in the circulation path 9 fluctuates in response to the temperature change, and hence the reservoir tank 2 pressurizes the coolant to the specific value using a pressurization device 3 and stores the coolant in order to absorb the volume fluctuation and make the coolant less likely to be vaporized by an increase in temperature. With this, the coolant flowing in the circulation path 9 becomes less likely to be vaporized, and it is possible to improve the capability to cope with a case where the amount of heat generated in the superconducting cable 1 fluctuates with time.

The coolant flowing in the circulation path 9 is pumped to the heat exchange section 17 by the circulation pump 5. The heat exchange section 17 is formed so as to use a material having a high thermal conductivity or have a structure having a high thermal conductivity, and is constituted to be capable of heat exchange of the amount of heat received from the coolant flowing therein with the outside. For example, the circulation path 9 forms a pipe-shaped flow path made of a material having the thermal conductivity such as a metal or the like, and is formed to allow the coolant to flow in the circulation path 9. In this case, the shape thereof may be appropriately devised by having a large surface area such as a radiator on an as needed basis. Though described later in detail, the space outside the heat exchange section 17 is charged with a low-temperature liquefied gas and the coolant flowing inside the heat exchange section 17 is cooled by heat exchange with the liquefied gas charged in the space outside the heat exchange section 17.

The coolant cooled in the heat exchange section 17 passes through a flow rate sensor 8 provided on the downstream side, and is then supplied to the superconducting cable 1 again. With this, the low-temperature coolant is supplied to the superconducting cable 1 and the cryogenic state is continuously maintained. The flow rate sensor 8 is a flow rate detection unit which detects the flow rate of the coolant flowing in the circulation path 9, and transmits the detected flow rate value to a control section 50.

The heat exchange section 17 is disposed in a heat exchange unit 14 having a cooling space 15 charged (filled) with the liquefied gas. Particularly in the present embodiment, the liquefied gas charged in the cooling space 15 is liquid nitrogen similarly to the coolant flowing in the circulation path 9. Note that, as the liquefied gas, it is further preferable to use slush nitrogen in which liquid nitrogen and solid nitrogen are mixed, or the like.

A refrigerator 6 is a Brayton cycle refrigerator, and includes a compressor 10, a heat exchanger 11, an expander 12, and a Brayton cycle heat exchange section 13. The Brayton cycle heat exchange section 13 is disposed in the cooling space 15 of the heat exchange unit 14 charged with the liquefied gas together with the above-described heat exchange section 17. In the refrigerator 6 as the Brayton cycle refrigerator, a gas having a liquefaction temperature lower than that of the liquefied gas charged in the cooling space 15 is circulated. In the present embodiment, since liquid nitrogen is used as the liquefied gas charged in the cooling space 15, examples of the gas circulated in the refrigerator 6 preferably include a helium gas and a neon gas. Thus, these gases are circulated in the refrigerator 6, and the Brayton cycle heat exchange section 13 thereby has a temperature sufficiently lower than that of the liquefied gas charged in the cooling space 15. Consequently, by controlling the operation state of the refrigerator 6, it is possible to control the cooling temperature of the liquefied gas charged in the cooling space 15.

The coolant flowing in the heat exchange section 17 receives the amount of heat generated in the superconducting cable 1 when the coolant passes through the superconducting cable 1 and also receives the amount of heat when the coolant is pumped by the circulation pump 5, and the temperature thereof is thereby increased. In the heat exchange section 17, the coolant is cooled by the heat exchange of the amount of heat accumulated in the coolant in the manner described above with the liquefied gas charged in the cooling space 15. The temperature of the liquefied gas can be controlled by controlling the operation state of the refrigerator 6, as described above. Note that, ideally, it is possible to cool the coolant flowing in the heat exchange section 17 to the same temperature as that of the liquefied gas in the heat exchange unit 14 but, in reality, the temperature of the coolant is slightly higher than the temperature in the heat exchange unit 14 because the heat exchange area of the heat exchange section 17 is limited.

The temperature of the liquefied gas charged in the cooling space 15 is detected by a temperature sensor 7 serving as a temperature detection unit provided in the heat exchange unit 14. The temperature of the liquefied gas detected by the temperature sensor 7 is transmitted to the control section 50 as an electric signal.

The control section 50 is a control unit for controlling the operation state of the refrigerator 6 by transmitting a control signal to the refrigerator 6 based on information acquired from the flow rate sensor 8 and the temperature sensor 7. Herein, a theoretical description will be given to how to control the cooling ability of the refrigerator 6 when the control section 50 performs the cooling of the liquefied gas charged in the cooling space 15.

First, it is assumed that generated heat in the superconducting cable 1 is $P_c$ [W], the time period of generation of the generated heat is $t_1$ [second], generated heat in the circulation pump 5 is $P_p$ [W], the operation time period of the circulation pump 5 is $t_p$ [second], the mass of the liquefied gas charged in the cooling space 15 is M [kg], a specific heat is C [J/(K·kg)], and the cooling ability of the Brayton cycle refrigerator 6 is $P_b$ [W]. In addition, it is assumed that the flow rate of the coolant which cools the superconducting cable 1 (i.e., the flow rate detected by the flow rate sensor 8) is m [kg/second]. In this case, a temperature increase $\Delta T_c$ [K] of the coolant having passed through the superconducting cable 1 and the circulation pump 5 is determined by the following expression:

$$\Delta T_c = (P_c \times t_1 + P_p \times t_p)/(M \times C \times t_p) \quad (1).$$

Herein, the amount of generated heat Q [J] in the entire cooling system 100 is represented by:

$$Q = (P_c \times t_1 + P_p \times t_p) \quad (2).$$

The amount of generated heat Q is accumulated in the liquefied gas charged in the cooling space 15 and, in a case where it is assumed that the liquefied gas is not cooled by the refrigerator 6, the temperature of the liquefied gas is increased by a temperature $\Delta T$ calculated by the following expression:

$$\Delta T = Q/(M \times C) \quad (3).$$

Consequently, in order to cause the temperature increase of the liquefied gas to satisfy $\Delta T = 0$ [K], the amount of heat corresponding to the amount of generated heat Q may be appropriately removed from the liquefied gas charged in the cooling space 15, and hence the cooling ability $P_b$ of the Brayton cycle refrigerator 6 may be appropriately controlled so as to satisfy the following expression:

$$P_b = Q/t_p \quad (4).$$

Thus, the refrigerator 6 is controlled by the control section 50 so as to exert the cooling ability $P_b$ determined by the expression (4), and it thereby becomes possible to cause the temperature increase of the liquefied gas to satisfy $\Delta T = 0$ (K) and stably perform the cooling of the superconducting cable 1.

Figure 2:
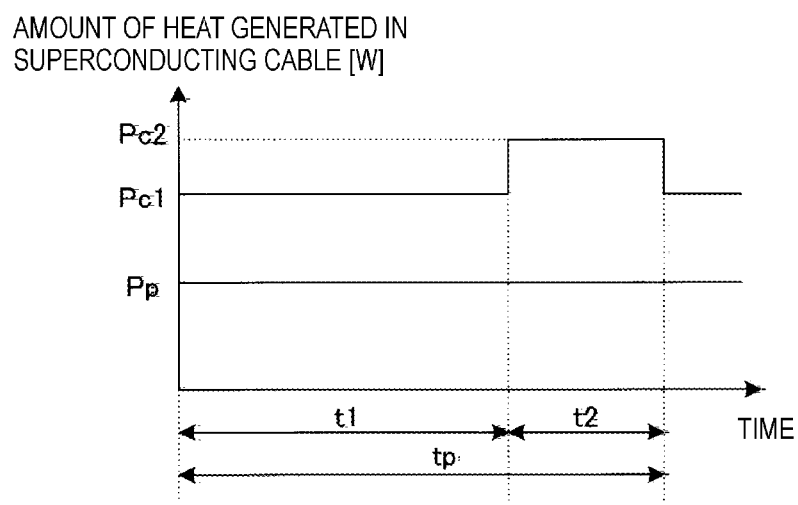
FIG. 2 is a graph showing an example of a change with time in the amount of heat generated in a superconducting cable in the superconducting cable cooling system according to the first embodiment.

Next, with reference to FIG. 2, a case where the amount of heat generated in the superconducting cable 1 fluctuates with time will be considered. FIG. 2 is a graph showing an example of a change with time in the amount of heat generated in the superconducting cable 1. In this example, a description will be given on the assumption that the generated heat in the superconducting cable 1 is $P_{c1}$ during the time period $t_1$ and is $P_{c2}$ during the time period $t_2$, and these states are alternately established.

In this case, the control section 50 may appropriately control the refrigerator 6 such that the average value of the amount of heat generated in the superconducting cable 1 is cooled. Specifically, since the circulation pump 5 is temporally continuously operated, $$t_p = t_1 + t_2$$

is satisfied, and hence the control section 50 may appropriately control the refrigerator 6 such that the cooling ability $P_b$ of the Brayton cycle refrigerator 6 satisfies the following expression:

$$P_b \times (t_1 + t_2) = (P_p + P_{c1}) \times t_1 + (P_p + P_{c2}) \times t_2 \quad (5).$$

Figure 3:
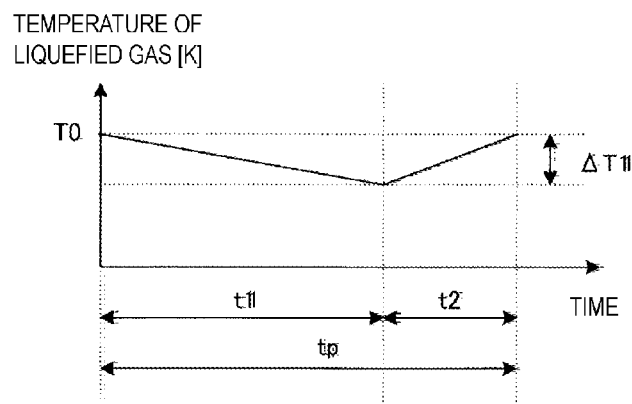
FIG. 3 is a graph showing the temperature change of the superconducting cable in a case where the cooling ability of a refrigerator is controlled according to an expression (5) in the superconducting cable cooling system according to the first embodiment.

FIG. 3 is a graph showing a change with time in the temperature of the liquefied gas charged in the cooling space 15 in a case where the cooling ability $P_b$ of the refrigerator 6 is controlled according to the expression (5). As described above, since the cooling ability $P_b$ of the refrigerator 6 is controlled to a constant value so as to cool the average value of the amount of heat generated in the superconducting cable 1, the amount of generated heat during the time period $t_1$ is smaller than that during the time period $t_2$ (see FIG. 2) so that the temperature of the liquefied gas is gradually reduced during the time period $t_1$. On the other hand, the amount of generated heat during the time period $t_2$ is larger than that during the time period $t_1$ so that the temperature of the liquefied gas is gradually increased during the time period $t_2$ and returns to an initial temperature T0.

Theoretically, the amount of generated heat $Q_1$ [J] during the time period $t_1$ is determined by the following expression:

$$Q_1 = (P_{c1} + P_p) \times t_1 \quad (6)$$

The amount of generated heat $Q_1$ is accumulated in the liquefied gas charged in the cooling space 15 to increase the coolant temperature, but the liquefied gas is cooled by the refrigerator 6. As a result, the temperature change $\Delta T_1$ during the time period $t_1$ is calculated by the following expression:

$$\Delta T_1 = (P_{c1} + P_p - P_b) \times t_1/(M \times C) \quad (7).$$

During the time period $t_2$, since the cooling ability $P_b$ of the refrigerator 6 is controlled according to the expression (5), the temperature of the liquefied gas is increased by $\Delta T_1$ and returns to the initial temperature T0. Note that $\Delta T_1$ can also be calculated by using $t_2$ by the following expression:

$$\Delta T_1 = (P_{c2} + P_p - P_b) \times t_2/(M \times C) \quad (8).$$

Thus, the liquefied gas of which the temperature is controlled by the control section 50 cools the coolant flowing in the heat exchange section 17 by performing the heat exchange with the heat exchange section 17. When it is assumed that the temperature of the liquefied gas is $T_s$, the coolant temperature $T_c$ at the entrance of the superconducting cable 1 is represented by the following expression:

$$T_c = T_s + \Delta T_c \qquad (9).$$

Herein, $\Delta T_c$ is the temperature difference determined by the heat exchange efficiency of the heat exchange section 17 in the heat exchange unit 14, and the structure and the material of each of the heat exchange unit 14 and the heat exchange section 17 may be appropriately selected such that the temperature difference has a specific value.

Figure 4:
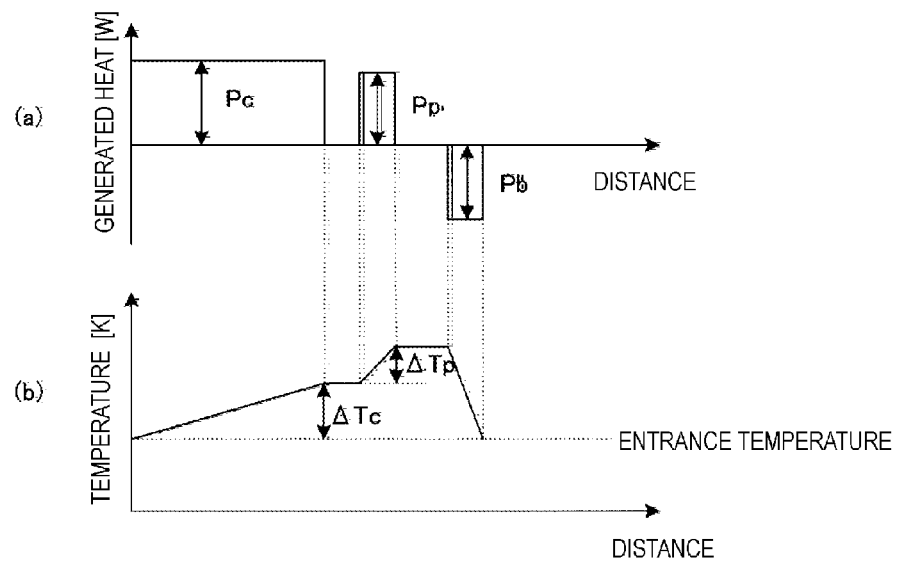
FIG. 4 is a graph showing generated heat received by a coolant and the temperature distribution of the coolant at each portion of a circulation path of the superconducting cable cooling system according to the first embodiment.

Subsequently, FIG. 4 is a graph showing generated heat received by the coolant and the temperature distribution of the coolant at each portion of the circulation path 9 of the superconducting cable cooling system according to the first embodiment. Note that the horizontal axis of FIG. 4 indicates the distance from a reference position (the exit of the coolant of the superconducting cable 1), the vertical axis of FIG. 4(a) indicates the generated heat at each portion, and the vertical axis of FIG. 4(b) indicates the temperature at each portion.

The coolant flowing in the circulation path 9 receives the amount of heat $P_c$ in the superconducting cable 1, and the temperature thereof is thereby increased by $\Delta T_c$. In addition, the coolant further receives the amount of heat $P_P$ in the circulation pump 5, and the temperature thereof is thereby increased by $\Delta T_P$. Subsequently, the coolant pumped to the heat exchange section 17 by the circulation pump 5 is cooled by the heat exchange with the liquefied gas charged in the cooling space 15 in the heat exchange unit 14, and the temperature thereof returns to the initial entrance temperature.

Note that dielectric strength is reduced when the coolant flowing in the circulation path 9 is vaporized in the cooling system 100, and hence it is necessary to control the upper limit value of the temperature of the coolant such that the upper limit value thereof falls within a temperature range which does not allow the coolant to be vaporized. For example, the temperature at which liquid nitrogen is vaporized is 77 [K] with a pressure corresponding to atmospheric pressure. Therefore, the temperature increase in the superconducting cable 1 is preferably set to a low value in consideration of the temperature increase caused by the generated heat of the circulation pump 5.

Thus, in the first embodiment, the coolant which is used to cool the superconducting cable 1 and has a temperature increased by the use is cooled by being pumped to the heat exchange section 17 provided on the circulation path 9 by the circulation pump 5, and subjected to the heat exchange with the liquefied gas charged in the cooling space 15 in the heat exchange unit 14. At this point, the amount of heat from the superconducting cable 1 received by the coolant flowing in the circulation path 9 is accumulated in the liquefied gas, and a thermal load accumulated in the liquefied gas is removed by the refrigerator 6. That is, in the present embodiment, it is possible to cause the liquefied gas to function as a thermal buffer by temporarily accumulating the thermal load from the superconducting cable 1 in the liquefied gas. With this, the refrigerator 6 controls the temperature of the liquefied gas such that the temperature thereof has the specific value, and it is thereby possible to control the temperature of the coolant such that the temperature thereof can be stably maintained even in a case where the amount of heat generated in the superconducting cable 1 fluctuates with time.

Second Embodiment

Figure 5:
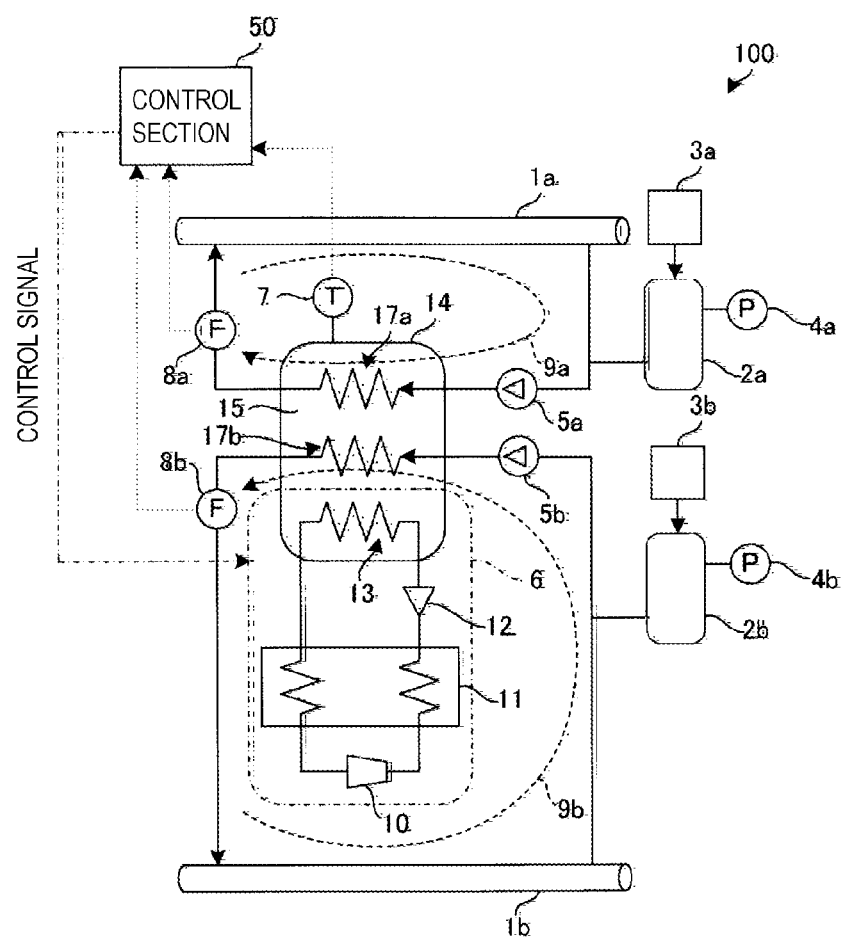
FIG. 5 is a structural view schematically showing the entire structure of a superconducting cable cooling system according to a second embodiment.

FIG. 5 is a structural view schematically showing the entire structure of the superconducting cable cooling system 100 according to a second embodiment. Note that components which are the same as those in the first embodiment are designated by the same reference numerals and the repeated description thereof will be omitted appropriately.

The superconducting cable cooling system 100 according to the second embodiment is characterized in that it is possible to cool a plurality of the superconducting cables of a superconducting cable 1a and a superconducting cable 1b with one Brayton cycle refrigerator 6. The superconducting cables 1a and 1b are provided with circulation pumps 5a and 5b, heat exchange sections 17a and 17b, flow rate sensors 8a and 8b, and reservoir tanks 2a and 2b respectively, and circulation paths 9a and 9b which are independent of each other are formed. Since the circulation paths 9a and 9b are independent of each other, a structure is adopted in which the pressures and the flow rates can be set individually and can be controlled independently of each other.

Both of the heat exchange sections 17a and 17b are disposed in the common cooling space 15 provided in the heat exchange unit 14. As described above, the Brayton cycle heat exchange section 13 is also disposed in the cooling space 15, and the liquefied gas is charged in the cooling space 15. The Brayton cycle refrigerator 6 is controlled by the control section 50, and the liquefied gas charged in the cooling space 15 is thereby cooled to a specific temperature.

The coolants flowing in the circulation paths 9a and 9b are cooled in the heat exchange sections 17a and 17b through the accumulation of heat in the liquefied gas charged in the cooling space 15, and the exit temperatures of the heat exchange sections 17a and 17b are determined by the temperature of the liquefied gas charged in the cooling space 15. Accordingly, the temperature of the liquefied gas is controlled to a specific temperature by controlling the Brayton cycle refrigerator 6 based on the temperature detected by the temperature sensor 7, and the coolant temperatures at the entrances of the superconducting cable 1a and the superconducting cable 1b thereby become identical with each other, and become a specific temperature.

Herein, when it is assumed that the amount of heat generated in the superconducting cable 1a is $P_{ca}$ [W], the amount of heat generated in the superconducting cable 1b is $P_{cb}$ [W], the amount of heat generated in the circulation pump 5a is $P_{pa}$ [W], the amount of heat generated in the circulation pump 5b is $P_{pb}$ [W], the heat generation time period of the superconducting cable 1a is $t_{1a}$ [second], the heat generation time period of the superconducting cable 1b is $t_{1b}$ [second], and the operation time period of each of the circulation pumps 5a and 5b is $t_p$ [second], the total amount of heat Q [J] in the superconducting cables 1a and 1b and the circulation pumps 5a and 5b is calculated by the following expression:

$$Q = P_{ca} \times t_{1a} + P_{cb} \times t_{1b} + P_{pa} \times t_p + P_{pb} \times t_p \qquad (10).$$

The total amount of heat may be accumulated in the liquefied gas charged in the cooling space 15, and may be removed by the Brayton cycle refrigerator 6. Consequently, the cooling ability $P_b$ [W] of the Brayton cycle refrigerator 6 may be controlled so as to satisfy the following expression:

$$P_b = Q/t_p \qquad (11).$$

Thus, since the cooling ability $P_b$ of the Brayton cycle refrigerator 6 is calculated based on the total amount of heat in the superconducting cables 1a and 1b and the circulation pumps 5a and 5b, the cooling ability $P_b$ thereof is not influenced by the fluctuation with time of the generated heat in the superconducting cables 1a and 1b.

Thus, in the cooling system 100 according to the second embodiment, there is no influence caused by a difference in length between the superconducting cables 1a and 1b or a difference in the amount of the generated heat, and the respective entrance temperatures are determined by the temperature of the liquefied gas charged in the cooling space 15. Consequently, the control section 50 can control the cooling temperature at each of the superconducting cables 1a and 1b easily and stably by causing the Brayton cycle refrigerator 6 to operate based on the temperature detected by the temperature sensor 7.

Note that, in the description of the present application, although the description has been given of the case where the number of superconducting cables 1 is two, it is also possible to perform the cooling with one Brayton cycle by having the same structure also in a case where the number of superconducting cables 1 is increased to three or more.

Third Embodiment

Figure 6:
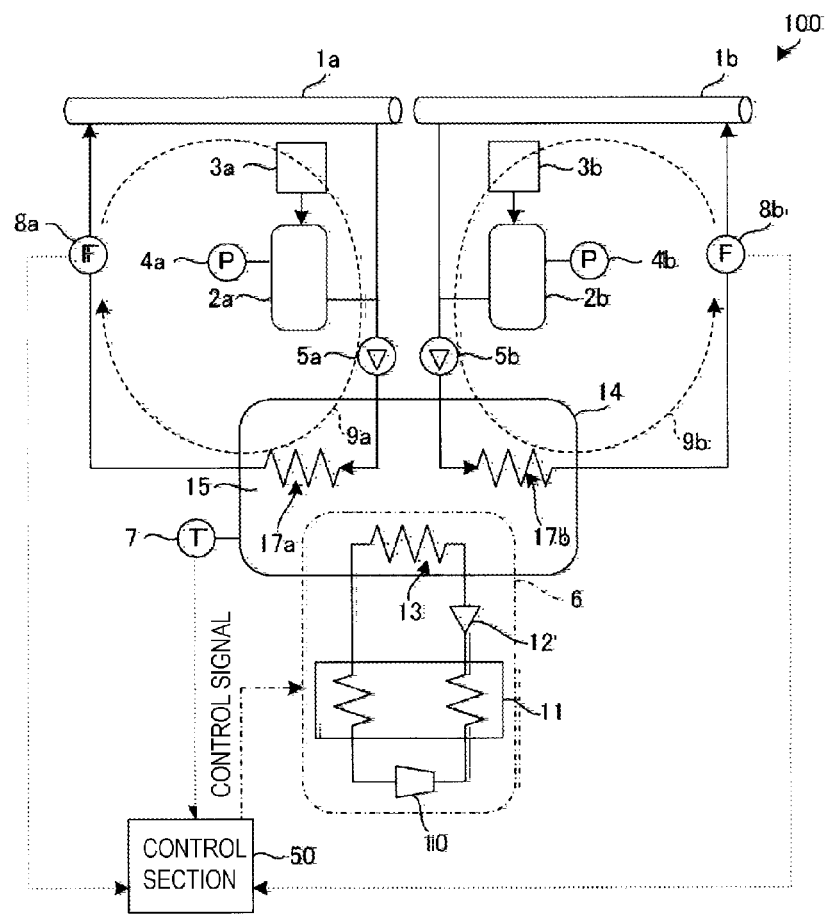
FIG. 6 is a structural view schematically showing the entire structure of a superconducting cable cooling system according to a third embodiment.

Next, with reference to FIG. 6, a description will be given of the superconducting cable cooling system 100 according to a third embodiment. FIG. 6 is a structural view schematically showing the entire structure of the superconducting cable cooling system 100 according to the third embodiment. Note that components which are the same as those in the first embodiment are designated by the same reference numerals and the repeated description thereof will be omitted appropriately.

In a case where the superconducting cable is used for long-distance power transmission, as shown in FIG. 6, there are cases where the long-distance power transmission is achieved by connecting the superconducting cables 1a and 1b in series. In such cases, since the pressurization ability of the circulation pump 5 is limited, the circulation paths 9a and 9b which are independent of each other are provided in correspondence to the respective superconducting cables.

In the example shown in FIG. 6, a structure is adopted in which the superconducting cables 1a and 1b which are adjacent to each other can be cooled with one Brayton cycle refrigerator 6. The superconducting cables 1a and 1b are formed with the circulation paths 9a and 9b which are independent of each other, and the circulation paths 9a and 9b include the circulation pumps 5a and 5b, the heat exchange sections 17a and 17b, the flow rate sensors 8a and 8b, and the reservoir tanks 2a and 2b, respectively. Since the circulation paths 9a and 9b are independent of each other, the pressures and the flow rates can be set individually, and the operation can be performed in a state where the circulation paths 9a and 9b are independent of each other.

Both of the heat exchange sections 17a and 17b are disposed in the same cooling space 15 of the heat exchange unit 14. As described above, the Brayton heat exchange section 13 is also disposed in the cooling space 15 of the heat exchange unit 14, and the liquefied gas is charged in the cooling space 15 thereof. The Brayton cycle refrigerator 6 is controlled by the control section 50, and the liquefied gas is thereby cooled to a specific temperature.

The coolants flowing in the circulation paths 9a and 9b are cooled in coolant heat exchanges 4a and 4b through the accumulation of heat in the liquefied gas charged in the cooling space 15, and the exit temperatures of the heat exchange sections 17a and 17b are determined by the temperature of the liquefied gas in the cooling space 15 of the heat exchange unit 14. Accordingly, the temperature of the liquefied gas in the cooling space 15 of the heat exchange unit 14 is controlled to a specific temperature by controlling the Brayton cycle refrigerator 6 based on the temperature detected by the temperature sensor 7, and the coolant temperatures at the entrances of the superconducting cable 1a and the superconducting cable 1b thereby become identical with each other, and become a specific temperature.

Herein, it is assumed that the amount of heat generated in the superconducting cable 1a is $P_{ca}$ [W], the amount of heat generated in the superconducting cable 1b is $P_{cb}$ [W], the amount of heat generated in the circulation pump 5a is $P_{pa}$ [W], the amount of heat generated in the circulation pump 5b is $P_{pb}$ [W], the heat generation time period of the superconducting cable 1a is $t_{1a}$ [second], the heat generation time period of the superconducting cable 1b is $t_{1b}$ [second], and the operation time period of each of the circulation pumps 5a and 5b is $t_p$ [second]. The total amount of heat Q [J] in the superconducting cables 1a and 1b and the circulation pumps 5a and 5b is calculated by the following expression:

$$Q = P_{ca} \times t_{1a} + P_{cb} \times t_{1b} + P_{pa} \times t_p + P_{pb} \times t_p \quad (12).$$

The total amount of heat may be accumulated in the liquefied gas charged in the cooling space 15, and may be removed by the Brayton cycle refrigerator 6. Consequently, the cooling ability $P_b$ [W] of the Brayton cycle refrigerator 6 may be controlled so as to satisfy the following expression:

$$P_b = Q/t_p \quad (13).$$

Thus, since the cooling ability $P_b$ of the Brayton cycle refrigerator 6 is calculated based on the total amount of heat in the superconducting cables 1a and 1b and the circulation pumps 5a and 5b, the cooling ability $P_b$ thereof is not influenced by the fluctuation with time of the generated heat in the superconducting cables 1a and 1b.

Thus, according to the third embodiment, by forming the circulation paths 9a and 9b which are independent of each other in the superconducting cables 1a and 1b which are connected in series and disposed adjacent to each other, and disposing the heat exchange sections 17a and 17b provided in the circulation paths 9a and 9b in the single cooling space 15, it is possible to supply the coolant having the stable temperature to the superconducting cables 1a and 1b.

Fourth Embodiment

Figure 7:
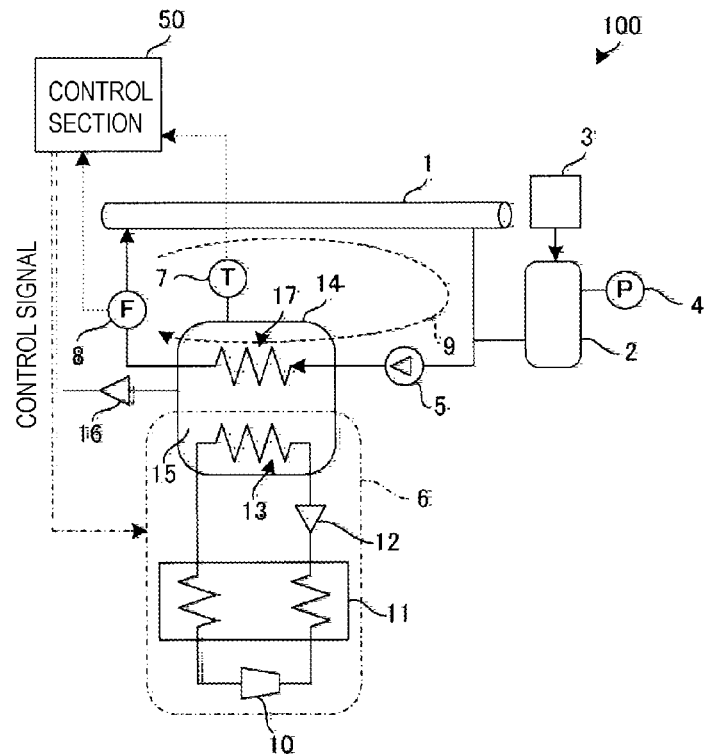
FIG. 7 is a structural view schematically showing the entire structure of a superconducting cable cooling system according to a fourth embodiment.

Next, with reference to FIG. 7, a description will be given of the superconducting cable cooling system 100 according to a fourth embodiment. FIG. 7 is a structural view schematically showing the entire structure of the superconducting cable cooling system 100 according to the fourth embodiment. Note that components which are the same as those in the first embodiment are designated by the same reference numerals and the repeated description thereof will be omitted appropriately.

In the fourth embodiment, a structure is adopted in which the liquefied gas charged in the cooling space 15 can be decompressed and cooled by attaching an evacuation device 16 to the heat exchange unit 14. Herein, when it is assumed that the volume of the liquefied gas charged in the cooling space 15 is V [m³], the pressure is p [Pa], and the gas constant of the liquefied gas is R, $$p \times V = R \times T \quad (14)$$

is satisfied. By maintaining the volume V at a constant value and reducing the pressure p, it is possible to reduce the temperature T.

That is, in the present embodiment, even in a case where the refrigerator 6 is stopped due to a cause such as the periodic check or the breakdown of the refrigerator 6, by decompressing the cooling space 15 using the evacuation device 16, it is possible to cool the liquefied gas charged in the cooling space 15. Consequently, it is possible to implement the superconducting cable cooling system 100 having higher reliability.

Note that it will be easily understood that the evacuation device 16 can be attached to the heat exchange unit 14 in each of the embodiments described above, and the similar effect can be obtained.

Fifth Embodiment

Figure 8:
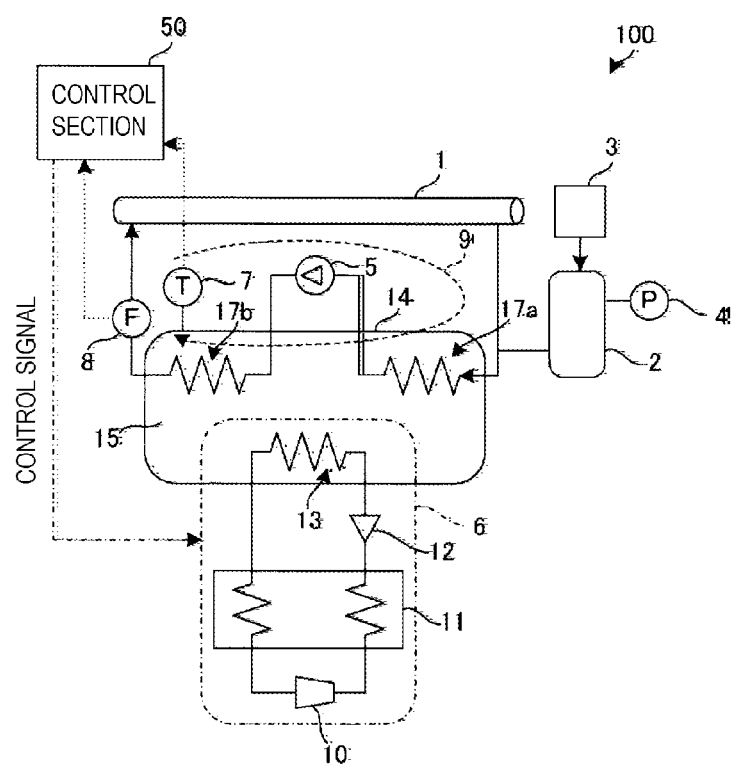
FIG. 8 is a structural view schematically showing the entire structure of a superconducting cable cooling system according to a fifth embodiment.
Figure 9:
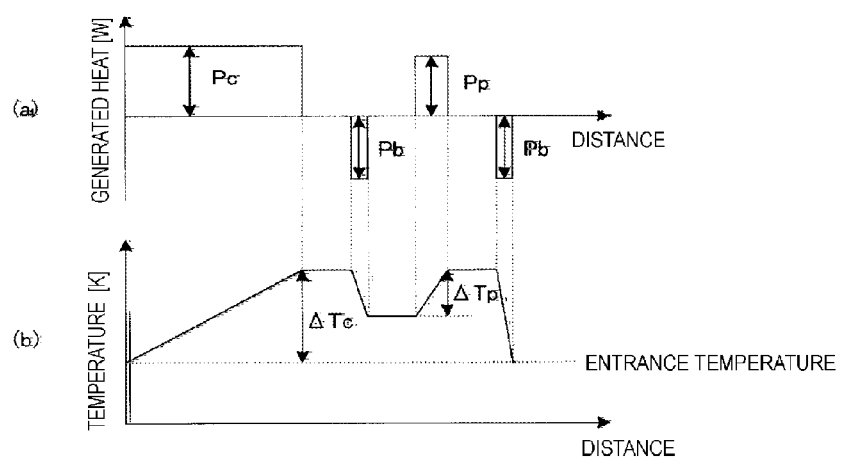
FIG. 9 is a graph showing the generated heat received by the coolant and the temperature distribution of the coolant at each portion of the circulation path of the superconducting cable cooling system according to the fifth embodiment.

Next, with reference to FIGS. 8 and 9, a description will be given of the superconducting cable cooling system 100 according to a fifth embodiment. FIG. 8 is a structural view schematically showing the entire structure of the superconducting cable cooling system 100 according to the fifth embodiment. FIG. 9 is a graph showing the generated heat received by the coolant and the temperature distribution of the coolant at each portion of the circulation path 9 of the superconducting cable cooling system according to the fifth embodiment. Note that the horizontal axis of FIG. 9 indicates the distance from the reference position (the exit of the coolant of the superconducting cable 1), the vertical axis of FIG. 9(a) indicates the generated heat at each portion, and the vertical axis of FIG. 9(b) indicates the temperature at each portion. Note that components which are the same as those in the first embodiment are designated by the same reference numerals and the repeated description thereof will be omitted appropriately.

As shown in FIG. 8, in the fifth embodiment, a plurality of the heat exchange sections 17a and 17b are provided on the circulation path 9. In particular, the heat exchange sections 17a and 17b are provided such that the circulation pump 5 is disposed between the heat exchange sections 17a and 17b on the circulation path 9. With this, the coolant having cooled the superconducting cable 1 is cooled in the heat exchange section 17a once, then heated by the circulation pump 5, and cooled in the heat exchange section 17b again.

In addition, as shown in FIG. 9, the coolant flowing in the circulation path 9 receives the amount of heat $P_c$ in the superconducting cable 1, and the temperature thereof is increased by $\Delta T_c$. Subsequently, the coolant receives the amount of heat $P_p$ in the circulation pump 5 after being cooled in the heat exchange section 17a, and the temperature thereof is increased by $\Delta T_p$. Then, the coolant is pumped to the heat exchange section 17b by the circulation pump 5 to be cooled again, and the temperature thereof returns to the initial entrance temperature. Thus, in the present embodiment, unlike the first embodiment (see FIG. 4), the coolant is cooled in two stages in the heat exchange sections 17a and 17b provided before and after the circulation pump 5. Accordingly, it is possible to supply the coolant which is cooled in the heat exchange section 17a in advance to the circulation pump 5, and hence it is possible to secure a large margin to the generated heat in the circulation pump 5.

Herein, when it is assumed that the flow rate of the coolant in the circulation path 9 is m [kg/second] and the pressure of the pressurization by the circulation pump 5 is p [Pa], the amount of heat $P_p$ [W] generated in the circulation pump 5 is determined by the following expression:

$$P_p = k \times m \times p \quad (15).$$

Herein, k is a proportionality multiplier. As a result, when the flow rate is reduced, a pressure loss is reduced and the pressurization amount of the circulation pump 5 is also reduced. Consequently, the generated heat $P_p$ of the circulation pump 5 is significantly reduced, and it is possible to reduce the ability of the Brayton cycle refrigerator 6.

Thus, according to the fifth embodiment, it is possible to have a large difference in the temperature of the coolant between the entrance and the exit in the superconducting cable 1 by disposing the Brayton cycle heat exchange section 13 and the heat exchange sections 17a and 17b for cooling the coolant in the cooling space 15 of the heat exchange unit 14 and disposing the circulation pump 5 between the heat exchange sections 17a and 17b. With this, it is possible to reduce the flow rate of the coolant in the circulation path 9, and reduce the size of the circulation pump 5 or the Brayton cycle refrigerator 6. Note that it will be easily understood that the similar effect can be obtained also in a case where the present embodiment is applied to the second embodiment or the third embodiment.

INDUSTRIAL APPLICABILITY

The present invention can be used in the superconducting cable cooling system for cooling the superconducting cable used for transmission and distribution of electric power to a cryogenic temperature.

The invention claimed is:

1. A superconducting cable cooling system which forms a circulation path by pumping a coolant used for cooling a superconducting cable to a heat exchange section by using a circulation pump, and cooling the coolant by a refrigerator, then supplying the coolant to the superconducting cable, thereby cooling the superconducting cable,
   the superconducting cable cooling system comprising:
   a heat exchange unit which has a cooling space charged with a liquefied gas for causing the heat exchange section and the refrigerator to perform heat exchange;
   a flow rate detection unit which detects a flow rate of the coolant in the circulation path;
   a temperature detection unit which detects a temperature of the liquefied gas charged in the heat exchange unit; and
   a control section which controls the refrigerator based on the flow rate detected by the flow rate detection unit and the temperature detected by the temperature detection unit such that the temperature of the liquefied gas charged in the heat exchange unit has a specific value.

2. The superconducting cable cooling system according to claim 1, wherein the refrigerator is a Brayton cycle refrigerator having a Brayton cycle heat exchange section disposed in the cooling space.

3. The superconducting cable cooling system according to claim 1, wherein a reservoir tank, which pressurizes the coolant flowing in the circulation path to a specific pressure and stores the coolant, is connected to the circulation path.

4. The superconducting cable cooling system according to claim 1, further comprising:
   a decompression unit which decompresses the liquefied gas charged in the cooling space of the heat exchange unit.

5. The superconducting cable cooling system according to claim 1, wherein a plurality of the heat exchange sections are provided in the circulation path, and the circulation pump is provided between any plurality of the heat exchange sections.

6. The superconducting cable cooling system according to claim 1, wherein, in a case where a plurality of superconducting cables are provided, circulation paths are formed in correspondence to the individual superconducting cables, and heat exchange sections in the individual circulation paths are disposed in the single cooling space.

7. The superconducting cable cooling system according to claim 6, wherein, in a case where the plurality of the superconducting cables are connected in series, the heat exchange sections included in the circulation paths formed in correspondence to the adjacent superconducting cables from among the plurality of the superconducting cables are disposed in the cooling space.

* * * * *